(12) United States Patent
Vaisband (10) Patent No.: US 11,582,204 B2
(45) Date of Patent: Feb. 14, 2023

(54) SYSTEMS, AND METHODS FOR TRANSFERRING DATA BETWEEN SECURE NETWORKS THROUGH LESS SECURE NETWORKS

(71) Applicant: OVSECURE LTD, Nesher (IL)

(72) Inventor: Oleg Vaisband, Nesher (IL)

(73) Assignee: Mobulus Net. Ltd, Yokneam Ilit (IL)

( * ) Notice: Subject to any disclaimer, the term of this patent is extended or adjusted under 35 U.S.C. 154(b) by 93 days.

(21) Appl. No.: 16/963,263

(22) PCT Filed: Dec. 19, 2018

(86) PCT No.: PCT/US2018/066470
§ 371 (c)(1),
(2) Date: Jul. 20, 2020

(87) PCT Pub. No.: WO2019/126305
PCT Pub. Date: Jun. 27, 2019

(65) Prior Publication Data
US 2020/0344221 A1  Oct. 29, 2020

Related U.S. Application Data

(60) Provisional application No. 62/607,390, filed on Dec. 19, 2017.

(51) Int. Cl.
*H04L 9/40* (2022.01)
*G06F 21/60* (2013.01)
*H04L 9/08* (2006.01)

(52) U.S. Cl.
CPC ........ *H04L 63/0428* (2013.01); *G06F 21/606* (2013.01); *H04L 9/0819* (2013.01); *H04L 9/0877* (2013.01); *H04L 9/0894* (2013.01)

(58) Field of Classification Search
CPC . H04L 63/0428; H04L 9/0819; H04L 9/0877; H04L 9/0894; G06F 21/06
See application file for complete search history.

(56) References Cited

U.S. PATENT DOCUMENTS

| 11,425,559 B1* | 8/2022 | Church | G06F 9/45558 |
| 2003/0084186 A1* | 5/2003 | Yoshizawa | H04L 67/28 |
| | | | 709/250 |
| 2004/0260921 A1* | 12/2004 | Treadwell | H04L 63/0442 |
| | | | 713/150 |

(Continued)

FOREIGN PATENT DOCUMENTS

WO  WO-2014059952 A1 *  4/2014  ......... H04L 63/0823

OTHER PUBLICATIONS

Tadashi JP 2012108779 Encryption and Decryption Device for Hard Disk Drive, and Information Processing Apparatus, English Machine Translation, Published Jun. 7, 2012 (Year: 2012).*

*Primary Examiner* — Kristine L Kincaid
*Assistant Examiner* — Felicia Farrow
(74) *Attorney, Agent, or Firm* — Guy Levi; The IP Law Firm of Guy Levi, LLC (57) ABSTRACT

The disclosure relates to systems, methods and computer readable for generating double encryption of data through discrete modules that are air gapped at every stage. Furthermore, the transceivers disclosed can operate in "off-line" mode which can be adapted to communicate with any network access terminal regardless of the intermediate connecting network.

12 Claims, 7 Drawing Sheets

(56) References Cited

U.S. PATENT DOCUMENTS

| | | | |
|---|---|---|---|
| 2005/0036622 A1* | 2/2005 | Hay | H04L 63/0428 |
| | | | 380/270 |
| 2008/0250249 A1* | 10/2008 | Ma | G06F 21/78 |
| | | | 380/44 |
| 2011/0153969 A1* | 6/2011 | Petrick | H04L 63/10 |
| | | | 711/E12.091 |
| 2016/0013931 A1* | 1/2016 | Pisek | H04L 9/0631 |
| | | | 380/28 |

* cited by examiner

SYSTEMS, AND METHODS FOR TRANSFERRING DATA BETWEEN SECURE NETWORKS THROUGH LESS SECURE NETWORKS

CROSS REFERENCE TO RELATED APPLICATIONS

This patent application is a U.S. National Phase filing of commonly owned PCT Application No. PCT/US2018/066470, filed Dec. 19, 2018, claiming priority from U.S. Provisional Patent Application No. 62/607,390, filed Dec. 18, 2017, both which are incorporated herein by reference in their entirety.

COPYRIGHT NOTICE

A portion of the disclosure hereinbelow contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND

The disclosure is directed to systems, methods and computer readable media for enabling secure data transfer through insecure networks. Specifically, the disclosure is directed to the use of a dedicated encryption module to transfer data between secure networks through insecure, or less secure networks, and systems and methods implementing the same.

Communications networks connecting mobile devices, personal computers, servers, mainframes, and other devices have become the accepted mode for communicating information between users. This can include anything from basic sharing of photos to the sophistication and security required by large financial and banking institutions. It is increasingly more evident that securing communications is just as important as getting the information to its intended recipient. There have been many attempts at securing information using various encryption schemes, hiding data in VPN tunnels, using third parties to authenticate the sender of data, and many others.

Various institutions require the transfer of data between secure networks. Financial data, healthcare data and national security data are just some of the data that is transferred between secure networks. With more employees working remotely, the option of transferring segregated data using portable devices, such as FLASH drives and the like, is becoming less and less practical.

These and other issues are addressed by the disclosed technology.

SUMMARY

Disclosed, in various embodiments, are systems, methods and computer readable media for transferring data between secure networks through less secure network intermediary. More specifically, provided herein are devices, systems and methods of using a dedicated, selectably air-gapped encryption module to transfer data between secure networks through insecure, or less secure networks.

In an embodiment provided herein is a system for transferring data between secure location through less secure network, the system comprising: a first secure network; a first transceiver having at least an upstream encryption module configured to encrypt data using a first encryption key in communication with the first secure network and a downstream encryption module configured to encrypt the encrypted data from the upstream encryption module using a second encryption key, the downstream encryption module being in communication with the less secure network; a first programmable resource router in communication with the upstream encryption module and the downstream encryption module of the first transceiver, wherein the first programmable resource router is manually activated; a first shared non-volatile memory module, in communication with the upstream encryption module and the downstream encryption module, wherein under no circumstances is the first shared non-volatile memory in communication with both the upstream encryption module and the downstream encryption module of the first transceiver; a second secure network; a second transceiver having at least an upstream encryption module configured to decrypt data using a first encryption key in communication with the second secure network and a downstream encryption module configured to decrypt the data received from the less secure network using the second encryption key, the downstream encryption module being in communication with the less secure network; a second programmable resource router in communication with the upstream encryption module and the downstream encryption module of the second transceiver, wherein the second programmable resource router is manually activated; a second shared non-volatile memory module, in communication with the upstream encryption module and the downstream encryption module, wherein under no circumstances is the second shared non-volatile memory in communication with both the upstream encryption module and the downstream encryption module of the second transceiver.

In another embodiment, provided herein is a method for transferring data between at least two secure networks through a less secure network implemented in a computerized system comprising a first secure network; a first transceiver having at least an upstream encryption module configured to encrypt data using a first encryption key in communication with the first secure network and a downstream encryption module configured to encrypt the encrypted data from the upstream encryption module using a second encryption key, the downstream encryption module being in communication with the less secure network; a first programmable resource router in communication with the upstream encryption module and the downstream encryption module of the first transceiver, wherein the first programmable resource router is manually activated; a first shared non-volatile memory module, in communication with the upstream encryption module and the downstream encryption module, wherein under no circumstances is the first shared non-volatile memory in communication with both the upstream encryption module and the downstream encryption module of the first transceiver; a second secure network; a second transceiver having at least an upstream encryption module configured to decrypt data using a first encryption key in communication with the second secure network and a downstream encryption module configured to decrypt the data received from the less secure network using the second encryption key, the downstream encryption module being in communication with the less secure network a second programmable resource router in communication with the upstream encryption module and the downstream encryption module of the second transceiver, wherein the second programmable resource router is manually activated; a second shared non-volatile memory module, in communication with the upstream encryption module and the downstream encryption module, wherein under no circumstances is the second shared non-volatile memory in communication with both the upstream encryption module and the downstream encryption module of the second transceiver, the method comprising: a sending user, using the first programmable resource router, selectably powering the upstream encryption module of the first transceiver; transferring the data from the first secure network to the upstream encryption module of the first transceiver; using a first encryption key, encrypting the transferred data; transferring the encrypted data to the first shared non-volatile memory module of the first transceiver; using the first programmable resource router, selectably powering off the upstream encryption module of the first transceiver, thereby eliminating access from the upstream encryption module of the first transceiver to the first shared non-volatile memory of the first transceiver, the sending user, using the first programmable resource router, selectably powering the downstream encryption module of the first transceiver; transferring the encrypted data from the first shared non-volatile memory module of the first transceiver to the downstream encryption module of the first transceiver; using a second encryption key, encrypting the encrypted data received from the first shared non-volatile memory module of the first transceiver, thereby doubly encrypting the data received from the first secure network; transferring the doubly encrypted data to the less secure network; a receiving user, upon receiving indication of the data being sent through the less secure network, using the second programmable resource router, selectably powering the downstream encryption module of the second transceiver; using the second encryption key, decrypting the doubly encrypted data received from the less secure network thereby generating a once encrypted data; transferring the data to the second shared non-volatile memory module of the second transceiver; using the second programmable resource router, selectably powering off the downstream encryption module of the second transceiver, thereby eliminating access from the downstream encryption module of the second transceiver to the second shared non-volatile memory of the second transceiver; the receiving user, using the second programmable resource router, selectably powering the upstream encryption module of the second transceiver; transferring the once encrypted data from the second shared non-volatile memory module of the second transceiver to the upstream encryption module of the second transceiver; using the first encryption key, decrypting the once encrypted transferred data; thereby completely decrypting the transferred data; and transferring the completely decrypted data to the second secure network.

In yet another embodiment, provided herein is a method implemented in a computerized system for transferring data between at least two secure networks through a less secure network, comprising: using a first device in communication with a sending secure network, receiving the data sought to be transferred from a network access terminal; generating multiple encryption of the data, wherein the first device comprises at least two encryption modules, each with its own independent encryption key and wherein no more than a single encryption module is in communication with a shared sending memory module storing the data between encryptions at any time; sending the multiple encrypted data through the less secure network; using a second device in communication with a receiving secure network, receiving the data from the less secure network; decrypting the multiple encryption of the data, wherein the second device comprises the same number of encryption modules as in the first device, each with a corresponding independent encryption key and wherein no more than a single encryption module is in communication with a shared receiving memory module storing the data between encryptions at any time; and uploading the decrypted data to the receiving secure network through a network access terminal.

In another embodiment, provided herein is a network terminal device for secured data transfer comprising: a programmable network resource router, a shared memory module; an upstream encryption module in communication with a secure network, the programmable network resource router and the shared memory module; and a downstream encryption module in communication with a less secure network, the programmable network resource router and the shared memory module, wherein the programmable network resource router is programmed to only enable communication between the upstream encryption and the shared memory, or the downstream encryption module and the memory, bot not both simultaneously, and wherein data transferred between the secured network and the less secured network is double encrypted These and other features of the systems, methods and computer readable media for providing proximity-based access, authentication and authorization to a communication network, will become apparent from the following detailed description when read in conjunction with the figures and examples, which are exemplary, not limiting.

BRIEF DESCRIPTION OF THE FIGURES

For a better understanding of the systems, methods and computer readable media for providing proximity-based access, authentication and authorization to a communication network, reference is made to the accompanying examples and figures, in which:

FIG. 4A illustrates a two router configuration with FIG. 4B illustrating a main-office-remote location configuration where data is transferred from FLASH drive to a FLASH drive using wireless router(s), and FIG. 4C illustrating the configuration of 4B powered by battery;

DETAILED DESCRIPTION

Provided herein are embodiments of devices, systems, methods and computer readable media for enabling the transfer of data between secure networks/sources via less secure networks. More particularly, provided herein are embodiments of devices for generating double encryption of data through discrete modules that are air gapped at every stage. Furthermore, the transceivers disclosed can operate in "off-line" mode which can be adapted to communicate with any network access terminal regardless of the intermediate connecting network.

For example, sensitive data, carried on a secure laptop can be transferred to either an enterprise's main office or to another secure laptop if that laptop is in communication with another transceiver equipped with the appropriate encryption keys. Further, the transceivers allow for the use of custom encryption—fully customizable, for example triple AES 256 or purely customer-generated private symmetric encryption algorithm. In an embodiment, the transceivers, or gateways are battery powered and as such, can be used independently of a grid power source.

Furthermore, using two air gapped encryption module, the device (transceiver), the system generates multiple encryption, e.g., cascade ciphering, cascade encryption, or superencipherment. In an embodiment, the upstream encryption module provide the data encryption, while the downstream encryption module provides the superencryption, in other words, the outer level encryption. Alternatively, each encryption module can be configured to generate a completely independent layer of cryptography, using two different cipher keys stored in each encryption module.

Therefore, provided herein is a system for transferring data between secure location through less secure network, the system comprising: a first secure network; a first transceiver having at least an upstream encryption module configured to encrypt data using a first encryption key in communication with the first secure network and a downstream encryption module configured to encrypt the encrypted data from the upstream encryption module using a second encryption key, the downstream encryption module being in communication with the less secure network; a first programmable resource router in communication with the upstream encryption module and the downstream encryption module of the first transceiver, wherein the first programmable resource router is manually activated; a first shared non-volatile memory module, in communication with the upstream encryption module and the downstream encryption module, wherein under no circumstances is the first shared non-volatile memory in communication with both the upstream encryption module and the downstream encryption module of the first transceiver; a second secure network; a second transceiver having at least an upstream encryption module configured to decrypt data using a first encryption key in communication with the second secure network and a downstream encryption module configured to decrypt the data received from the less secure network using the second encryption key, the downstream encryption module being in communication with the less secure network; a second programmable resource router in communication with the upstream encryption module and the downstream encryption module of the second transceiver, wherein the second programmable resource router is manually activated; a second shared non-volatile memory module, in communication with the upstream encryption module and the downstream encryption module, wherein under no circumstances is the second shared non-volatile memory in communication with both the upstream encryption module and the downstream encryption module of the second transceiver.

The term "system" shall also be taken to include any collection of systems or sub-systems that individually or jointly execute a set, or multiple sets, of instructions to perform one or more functions. Also, the term "system" refers to a logical assembly arrangement of multiple devices, and is not restricted to an arrangement wherein all of the component devices are in the same housing.

The secure network (in other words, network that is protected from unauthorized access) can be, for example a virtual private network (VPN), referring to a plurality of information devices that are communicatively coupled via encrypted communication tunnels over a public network, such as the global Internet. Secure networks also refers to secure local access network (LAN), as well as any secure network and may, but does not necessarily, include networks protected by encryption or other security measures.

The first and second transceivers used herein are a stand-alone unit that is self-contained with its own power source. The transceiver units can be configured to be in communication with any secure network terminal and comprise the controls and circuitry necessary to carry out operational steps in either a manual mode and/or automatic mode. In other words, some operations carried out by the unit(s) (first or second and any of the plurality of units in communication with secure networks), can be carried out only with user intervention, while other operations will be executed by embedded firmware. In addition, the units may further comprise indicators, such as LED lights in various colors indicating certain operational stages are completed.

The term "network terminal" refers in an embodiment to any device that is accessible via an IP network, such as for example a personal computer, laptop or notebook linked to the IP network via a fixed or wireless link or a PDA or a smart phone linked to the IP network via a wireless link (see e.g., FIGS. 4A-4C), and the term "Network Access Terminal" refers to any device, such as for example a mobile phone, able to be connected to a Mobile Communication Network. The term (terminal), may further include some or all the functionality of, a user equipment (UE), a wireless or wired communication device, a network device, a personal communication device, mobile device, and/or a mobile station. In an embodiment, the network access terminal can be a hotspot, referring to a public access venue, location and/or geographical area in which a wireless access point (WAP) provides wireless network services (e.g. 802.11a/b/g/n based or supported services, WiMax based or supported services, cellular network based or supported services such as via CDMA, HSDPA, GPRS, etc., and other such services) to mobile visitors through a wireless local area network (WLAN), metropolitan area network (MAN), wide area network (WAN), or the like, using, for example but not limited to, Wi-Fi technology or the like.

Figure 1:
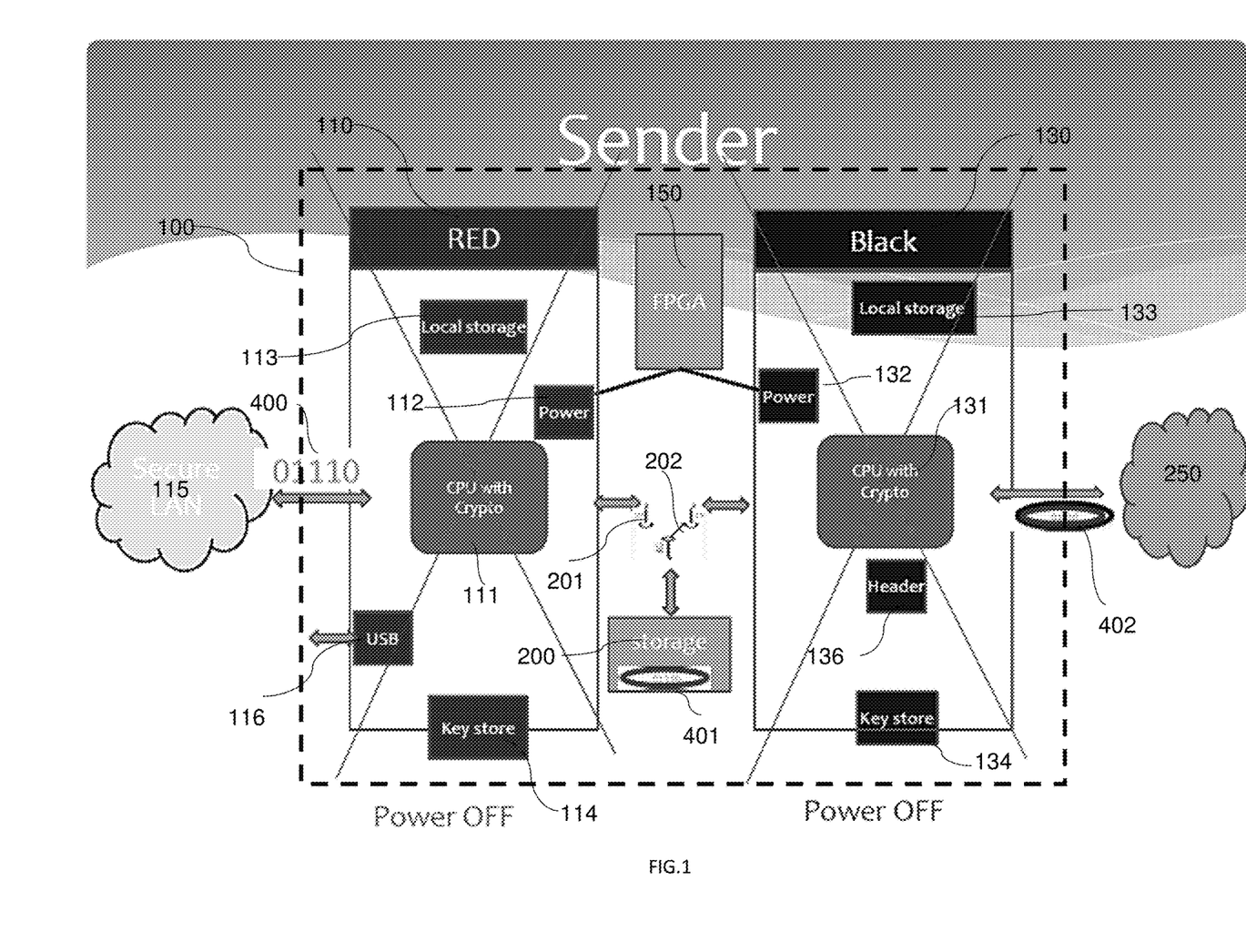
FIG. 1 is a schematic illustrating the components of a sending user's transceiver device.
Figure 2:
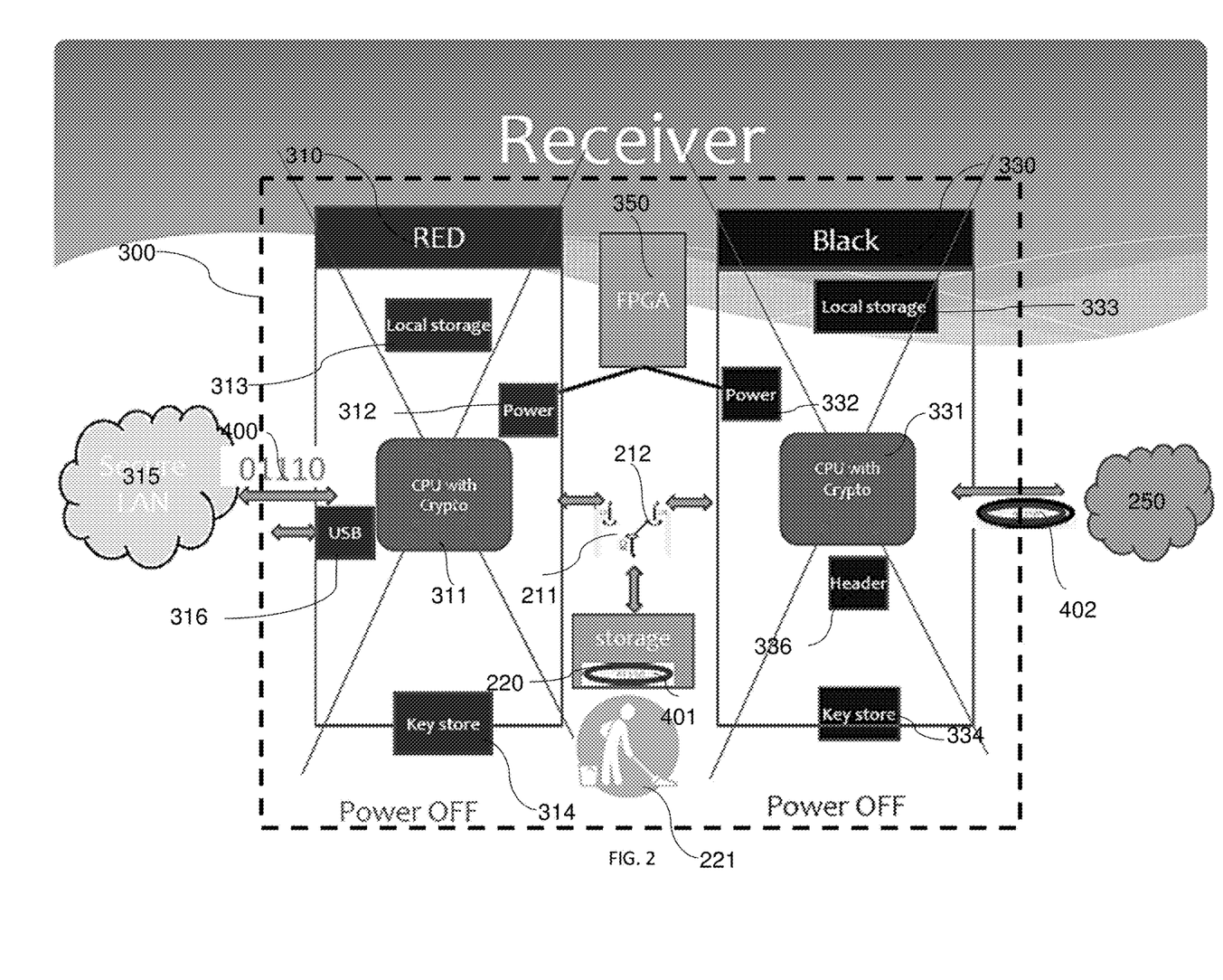
FIG. 2, is a schematic illustrating the components of a receiving transceiver device with the downstream encryption module powered up.
Figure 3:
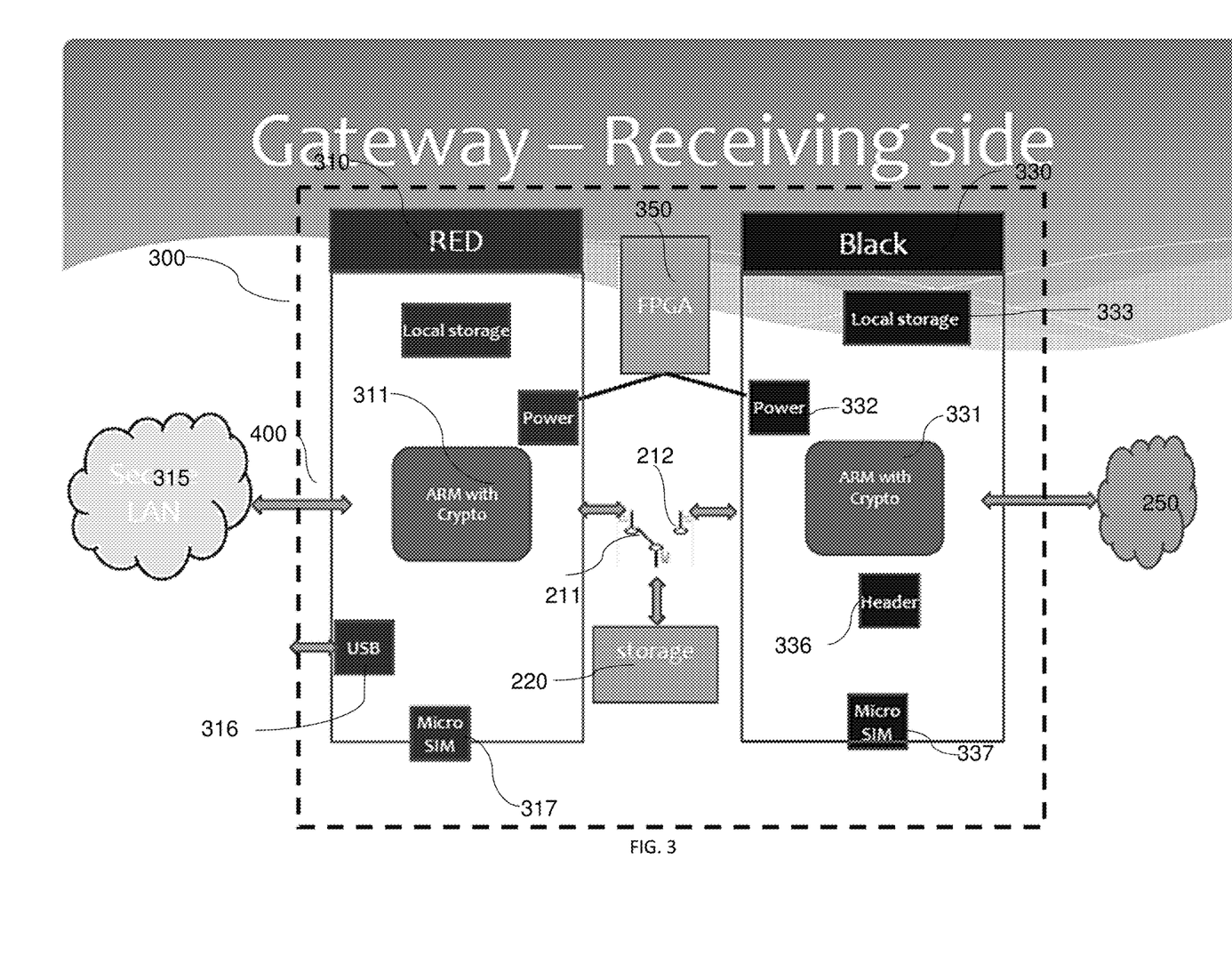
FIG. 3, is a schematic illustrating the components of a receiving transceiver device with the upstream encryption module powered up.

In an embodiment, and as illustrated in FIGS. 1-3, the sending user's upstream (Red) encryption module 110 and the downstream (Black) encryption module 130 of the first transceiver 100, and the receiving user's upstream (Red) encryption module 310 and the downstream (Black) encryption module 330 of the second transceiver 300, each comprises: main central processing unit (CPU) 111, 131, 311, 331; power module 112, 132, 312, 332; local memory 113, 133, 313, 333; and dedicated encryption key memory 114, 134, 314, 334. "Upstream" and "downstream", refer in an embodiment to the encryption modules' order relative to the network and/or device storing the secure data, whereby the 'upstream' encryption module is closer to the network and/or device storing the secure data, while 'downstream' encryption module is further down the network form the network and/or device storing the secure data. Generally, the downstream encryption module is configured to provide and/or remove the second encryption layer on the data, while the upstream encryption module is configured to provide and/or remove the first encryption layer.

Turning to FIG. 1, in which transceiver device 100 components are arranged. An identical transceiver 300 is illustrated in FIG. 2. As illustrated sender transceiver 100 comprises two encryption modules. Upstream encryption module (red, 110) and downstream encryption module 130

(black). As shown, upstream encryption module 110 comprises a main central processing unit (CPU) 111. The "processor" can include, but is not necessarily being limited to, an instruction execution system such as a computer/processor based system, an Application Specific Integrated Circuit (ASIC), a computing device, or a hardware and/or software system that can fetch or obtain the logic from a non-transitory storage medium or a non-transitory computer-readable storage medium and execute the instructions contained therein. The processor can also include any controller, state-machine, microprocessor, or any other analogue, digital and/or mechanical implementation thereof. In addition, the computer program (software and/or firmware), can comprise program code means for carrying out the steps of the methods described herein, as well as a computer program product comprising program code means stored on a medium that can be read by a computer, such as a floppy disk, a hard disk, CD-ROM, DVD, USB memory stick, or a storage medium that can be accessed via a data network, and may contain secured data sought to be transferred.

Also illustrated in FIG. 1, is local memory module 113, power module 112, and dedicated memory for storing cipher key 114. Also shown is sender secure network 115 and secure communication interface 116. Many network terminal devices are provided with one or more communication interfaces 116, according to the function intended of the network terminal devices. For example, a personal computer is often provided with a high speed serial port (RS-232, RS-422, etc.), an enhanced parallel port ("EPP"), and one or more universal serial bus ("USB") ports. The network terminal devices may also be provided with a local area network ("LAN") interface, such as an Ethernet card, and other high-speed interfaces such as the High Performance Serial Bus IEEE-1394.

Similarly, downstream (black) encryption module 130 can comprise main CPU 131, as well as local memory module 133, power module 132, and dedicated memory for storing cipher key 134. As shown in FIG. 1, both upstream encryption module (UEM) and downstream encryption module (DEM) are in communication with shared memory module 200, while UEM power module 112 and DEM power module 132 are in communication with programmable resource router 150. In an embodiment, programmable resource router 150 can be a field programmable gate array (FPGA).

In an embodiment, a user sending secure data through transceiver device 100 will power the device, at which point programmable resource router 150 is configured to shut off power to DEM 130 and provide power to UEM 110 (red). Illustrated in FIG. 1, is an example where DEM 130 is powered and UEM 110 is shut off, which opens communication contact 201 between DEM 110 and shared memory module 200. Initially, the sender will upload the data to UEM 110 local memory 113 and following encryption using $1^{st}$ encryption key, stored on dedicated key memory 114, upload the data to shared memory module 200, at which point programmable resource router 150 will provide an indication to the sending user that the data is encrypted ($1^{st}$ layer) and resident in the shared memory. The sending user will then manually actuate programmable resource router 150, at which point power to UEM 110 is cut, and DEM 130 is powered, opening contact 202 (see e.g., FIG. 1) between DEM 130 and shared memory module 200. Encrypted data 401 is then reencrypted (or superencrypted) using $2^{nd}$ encryption key, stored on dedicated encryption key memory 134, generating multiple encrypted data 402, which can then be uploaded to the less secure network 250.

It is noted that in certain embodiments, each encryption Key is externally generated and shared among devices. Further, each encryption key can be added, removed, modified in each of the encryption modules using, for example; serial out of band interface, secure digital (SD) card, memory card, smart card, near field communication (NFC), dedicated key pad, dedicated keyboard and the like. Furthermore, in addition to dedicated key memory 114 as described herein, the encryption key can be stored inside the module or may be required to be supplied after each power cycle (in this case the encryption key of the complementary encryption module (e.g, 110, 310 or 130, 330) will be stored in each encryption module RAM or other volatile memory. In other words, programmable resource router (150, 350 e.g.) may be programmed to erase the encryption key on the sender side once the corresponding encryption module has completed its portion, and once a new encryption is needed, a new encryption (independent per encryption module) will be generated and shared.

$1^{st}$ (sender's) Shared memory module 200 is a non-transitory memory module, interchangeable with the terms "non-transitory storage medium" and/or "non-transitory computer-readable storage medium" refers to, any media that can contain, store, or maintain programs, information, and data. Non-transitory storage medium and non-transitory computer-readable storage medium may include any one of many physical media such as, for example, electronic, magnetic, optical, electromagnetic, or semiconductor media. More specific examples of suitable non-transitory storage medium and non-transitory computer-readable storage medium include, but are not limited to, a magnetic computer diskette such as floppy diskettes or hard drives, magnetic tape, a random access memory (RAM), a read-only memory (ROM), an erasable programmable read-only memory (EPROM), a flash drive, a compact disc (CD), or a digital video disk (DVD).

Furthermore, the term "less secure network" refers in an embodiment to cover networks in which data is at increased risk from third parties as compared with the network sending and/or receiving the transferred data. For example, the data may be intercepted, accessed on a server without authorization, obtained following an exploit or any other means in which the data is at a higher risk for being obtained undesirably by a third party compared with the originating or target networks. In particular the less secure network may comprise the Internet, or, in another example, any network having no central digital certificate authority. Similarly, the term "less secure network" refers to communication over a network using conventional TCP/IP or the like, and without using techniques such as VPN tunnels (other than secure socket layer (SSL) certificates and authentication), to prevent the communication from being intercepted by a third party.

Turning now to FIG. 2, illustrating the device, or $2^{nd}$ transceiver 300 at the receiving network 315. Similar to $1^{st}$ transceiver 100, the receiving transceiver 300 comprises downstream (black) encryption/decryption module 330, which can comprise main CPU 331, as well as local memory module 333, power module 332, and dedicated memory for storing cipher key 334. As shown in FIG. 2, both upstream encryption module (UEM) and downstream encryption module (DEM) are in communication with shared receiving memory module 220, while UEM power module 312 and DEM power module 332 are in communication with programmable resource router 350. In an embodiment, programmable resource router 350 can likewise be a field programmable gate array (FPGA).

So, a user receiving multiple encrypted data 402 through transceiver device 300 will power device 300, at which point programmable resource router 350 can be configured to shut off power to UEM 310 and provide power to DEM 330. Illustrated in FIG. 2, is an example where DEM 330 is powered and UEM 310 is shut off, which opens communication 212 between DEM 330 and shared receiving memory module 220. Initially, the receiving entity (user) will upload multiple encrypted data 402 to DEM 330 local memory 333 and following decryption using $2^{nd}$ encryption key, stored on dedicated key memory 334, upload the once encrypted data 401 to shared receiving memory module 220, at which point programmable resource router 350 will provide an indication to the receiving user the data is decrypted (outer layer) and resident in the shared receiving memory 220. The receiving user will then manually actuate programmable resource router 350, at which point power to DEM 330 is cut (terminated), and UEM 330 is powered, opening contact 211 (see e.g., FIG. 3) between UEM 310 and shared receiving memory module 220. Encrypted data 401 is then decrypted using $1^{st}$ encryption key, stored on dedicated encryption key memory 314, regenerating original data 400, which can then be uploaded to secure receiving network 315.

Figure 4A:
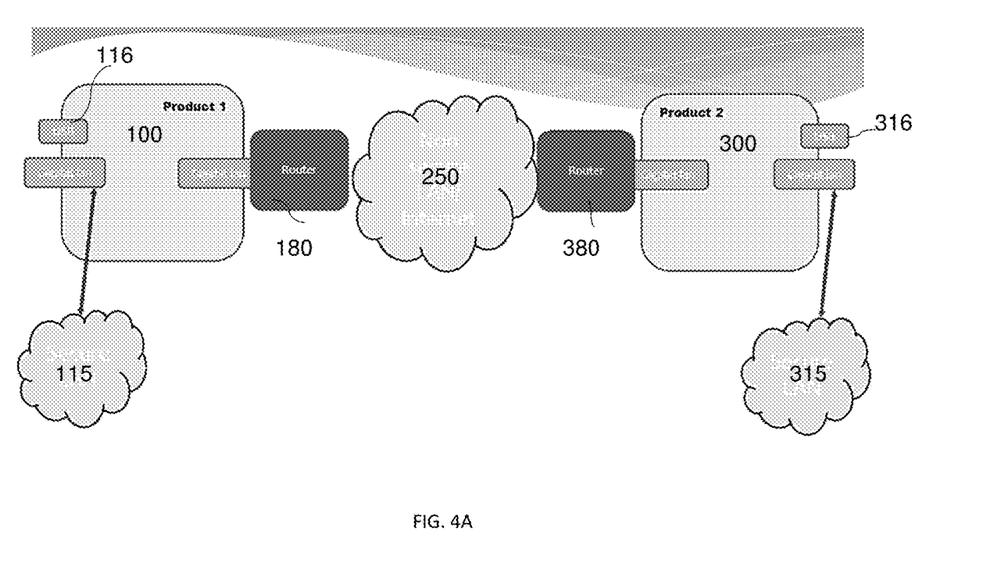
Figure 4B:
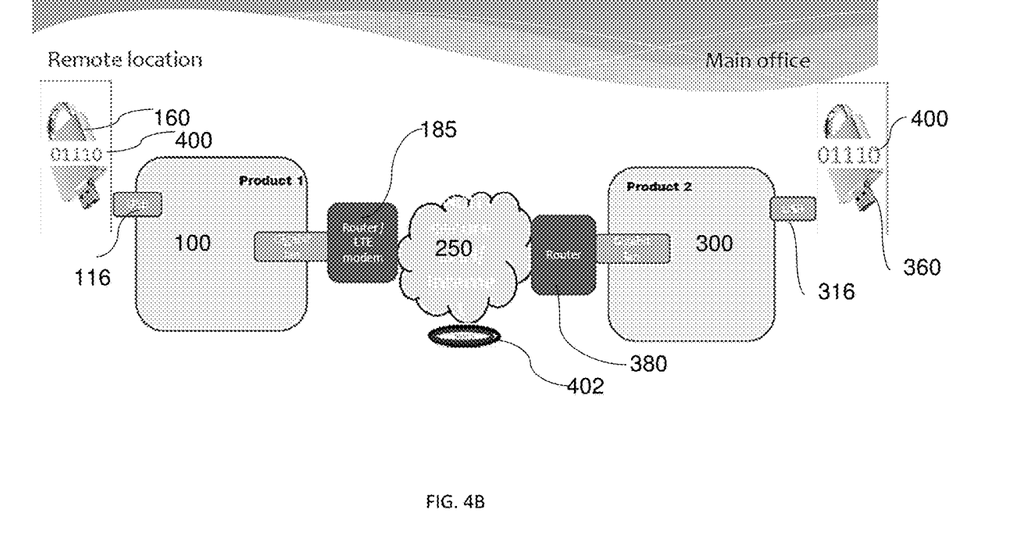
Figure 4C:
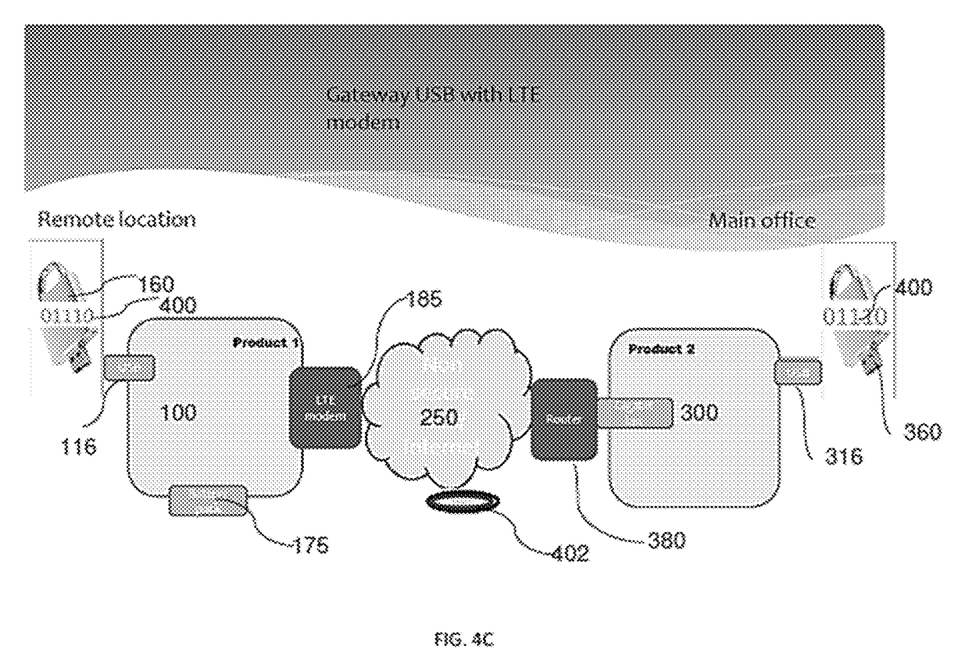

Transceivers 100 and 300, can be configured to operate 'off-line', as illustrated in FIG. 4A-4C. In other words, transceivers 100 and 300 can be a stand-alone device that is powered by any appropriate power source, such as a rechargeable battery, grid electric power, solar or the like, and be configured with various network access ports as described hereinabove. As illustrated in FIGS. 4A, devices (transceivers) 100 and 300 can be in wired LAN communication with secure sending network 115 and secure receiving network 315, and in communication with less secured network 250 via a sending router 180 and receiving router 380. In other words, the devices can be inserted in secure networks 115, and 315 before gateway routers 180 and 380 respectively, thus providing secure data transfer.

FIG. 4B illustrates sending device 100 equipped with access port (USB) 116, whereby a sending user in a remote location uses a USB drive 160 coupled to device 100 to generate multiple encrypted data that can then be sent to a receiving secure network 315 via wireless (LTE) router 185, while receiving secure network (main office e.g.) can have another device (transceiver 300) likewise configured with access port (USB) 316 and thus transfer, in secure manner data 400 to another USB drive 360. FIG. 4C, illustrates the same configuration where the sending transceiver device 100 is battery powered 175.

Figure 5:
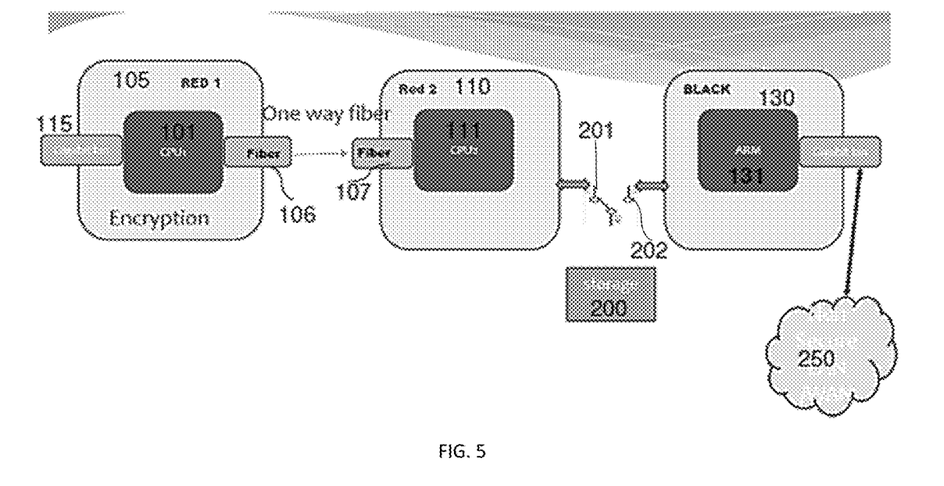
FIG. 5, illustrating a 2 CPU configuration for the upstream (Red) encryption/decryption module.

Turning now to FIG. 5, UEM of the first (100) and/or second (300) transceiver, each further can comprises primary CPU 101 (301, not shown), in communication with secure sending/receiving network (115, 315 respectively) and in one way communication with main CPU 111 (311 not shown), allowing for data transfer only in the direction to or from secure local network 115 (315 not shown) to main CPU 111 (311 not shown), using a data diode, for example a fiber optic network link. In this configuration, primary CPU 101 circuitry (red 1) will have transmitter interface 106, while main CPU 111 circuitry (red 2) will have receiver interface 107. Sending or receiving user will then need to manually initiate the unidirectional transfer of encrypted data 401 to main CPU 111 circuitry (red 2), thus adding another security stage to the data transfer. In an embodiment, initiating the unidirectional transfer of encrypted data 401 will cause the programmable resource router to shut the power to primary CPU 101 circuitry (red 1), thus severing the link to sending/receiving network 115.

The data diode can be, for example, a unidirectional data transmission system that uses a physical component referred to as an "optical data diode". This is a transmission pathway whose medium of support is an optical fiber, this component being adapted so that the signal can physically travel in one direction only, thereby presenting the dual advantage of rendering it impossible to transmit information in the other direction through this linkup, and of not emitting electromagnetic radiation that could provide a heat signature indicating its presence, unlike an electrical component. In an embodiment, the data diode is only used by the sending transceiver device. Other data diodes are commercially available and generally include different architectures, such as can include a data diode module from Owl Computing Technologies of Ridgefield, Conn., U.S.A., Fox-IT of Delft, The Netherlands, Tresys Technology LLC of Columbia, Md., U.S.A., Advenica of Lund, Sweden, of VADO security of Petach Tikva, Israel, among others.

In an embodiment, the devices, transceivers and systems described herein are used to implement the methods described. Accordingly, provided herein is a method implemented in a computerized system for transferring data between at least two secure networks through a less secure network, comprising: using a first device in communication with a sending secure network, receiving the data sought to be transferred from a network access terminal; generating multiple encryption of the data, wherein the first device comprises at least two encryption modules, each with its own independent encryption key and wherein no more than a single encryption module is in communication with a shared sending memory module storing the data between encryptions at any time; sending the multiple encrypted data through the less secure network; using a second device in communication with a receiving secure network, receiving the data from the less secure network; decrypting the multiple encryption of the data, wherein the second device comprises the same number of encryption modules as in the first device, each with a corresponding independent encryption key and wherein no more than a single encryption module is in communication with a shared receiving memory module storing the data between encryptions at any time; and uploading the decrypted data to the receiving secure network through a network access terminal. Further, the first and second devices can be battery powered, thus operate independently of being connected to a network, or in an off-line mode. As indicated, the network access terminal can be wired or wireless, for example, a network device, a personal communication device, a mobile device or a communication system comprising the foregoing. In an embodiment, the first device comprises two encryption modules, whereby the first encryption module provides an encryption layer and the second encryption module provides superencryption (in other words, an outer layer encryption).

Figure 6A:
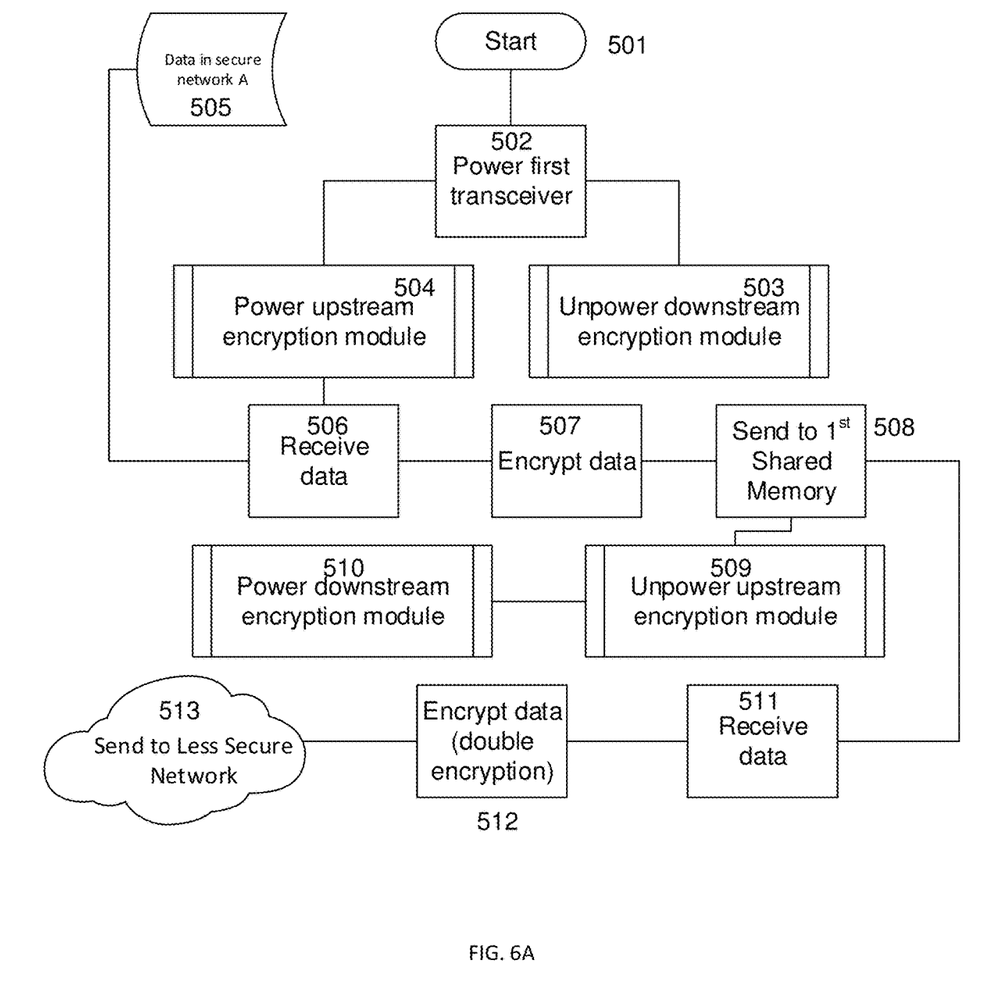
FIG. 6A is a flow chart illustrating the sending user operations to affect the transfer of data, with the receiving user operation illustrated in FIG. 6B.

In yet another embodiment, provided herein is a method for transferring data between at least two secure networks through a less secure network implemented in a computerized system comprising a first secure network; a first transceiver having at least an upstream encryption module configured to encrypt data using a first encryption key in communication with the first secure network and a downstream encryption module configured to encrypt the encrypted data from the upstream encryption module using a second encryption key, the downstream encryption module being in communication with the less secure network; a first programmable resource router in communication with the upstream encryption module and the downstream encryption module of the first transceiver, wherein the first programmable resource router is manually activated; a first shared non-volatile memory module, in communication with the upstream encryption module and the downstream encryption module, wherein under no circumstances is the first shared non-volatile memory in communication with both the upstream encryption module and the downstream encryption module of the first transceiver; a second secure network; a second transceiver having at least an upstream encryption module configured to decrypt data using a first encryption key in communication with the second secure network and a downstream encryption module configured to decrypt the data received from the less secure network using the second encryption key, the downstream encryption module being in communication with the less secure network a second programmable resource router in communication with the upstream encryption module and the downstream encryption module of the second transceiver, wherein the second programmable resource router is manually activated; a second shared non-volatile memory module, in communication with the upstream encryption module and the downstream encryption module, wherein under no circumstances is the second shared non-volatile memory in communication with both the upstream encryption module and the downstream encryption module of the second transceiver. As illustrated in FIG. 6A the method comprising: a sending user, powers the transceiver 502 using the first programmable resource router, selectably (in other words, manually) shuts power to the DEM 503 while powering 504 the UEM of the first transceiver. Then transferring the data 505 from the first secure network to the UEM of the first transceiver 506, after which, using a first encryption key, encrypting 507 the transferred data. The once encrypt data (401, see e.g., FIG. 1) is then transferred 508 to the first shared (sending) non-volatile memory module (200, see e.g., FIG. 1) of the first transceiver (100, see e.g., FIG. 1). Then, using the first programmable resource router (150, see e.g., FIG. 1), selectably powering off 509 the UEM (110, see e.g., FIG. 1) of the first transceiver, thereby eliminating access from the UEM of the first transceiver to the first shared non-volatile memory (200, see e.g., FIG. 1) of the first transceiver. The sending user, then using the first programmable resource router (150, see e.g., FIG. 1), selectably powering 510 the downstream encryption module of the first transceiver and transfer 511 the encrypted data (401, see e.g., FIG. 1) from the first shared non-volatile memory module (200, see e.g., FIG. 1) of the first transceiver to the DEM of the first transceiver. The receiving user then, using a second encryption key, encrypting 512 the encrypted data (401, see e.g., FIG. 1) received from the first shared non-volatile memory module of the first transceiver, thereby doubly encrypting the data (402, see e.g., FIG. 2) received from the first secure network (115, see e.g., FIG. 1), culminating in transferring the doubly encrypted data (402, see e.g., FIG. 2), via e.g., wide area network 513 to the less secure network 250.

Figure 6B:
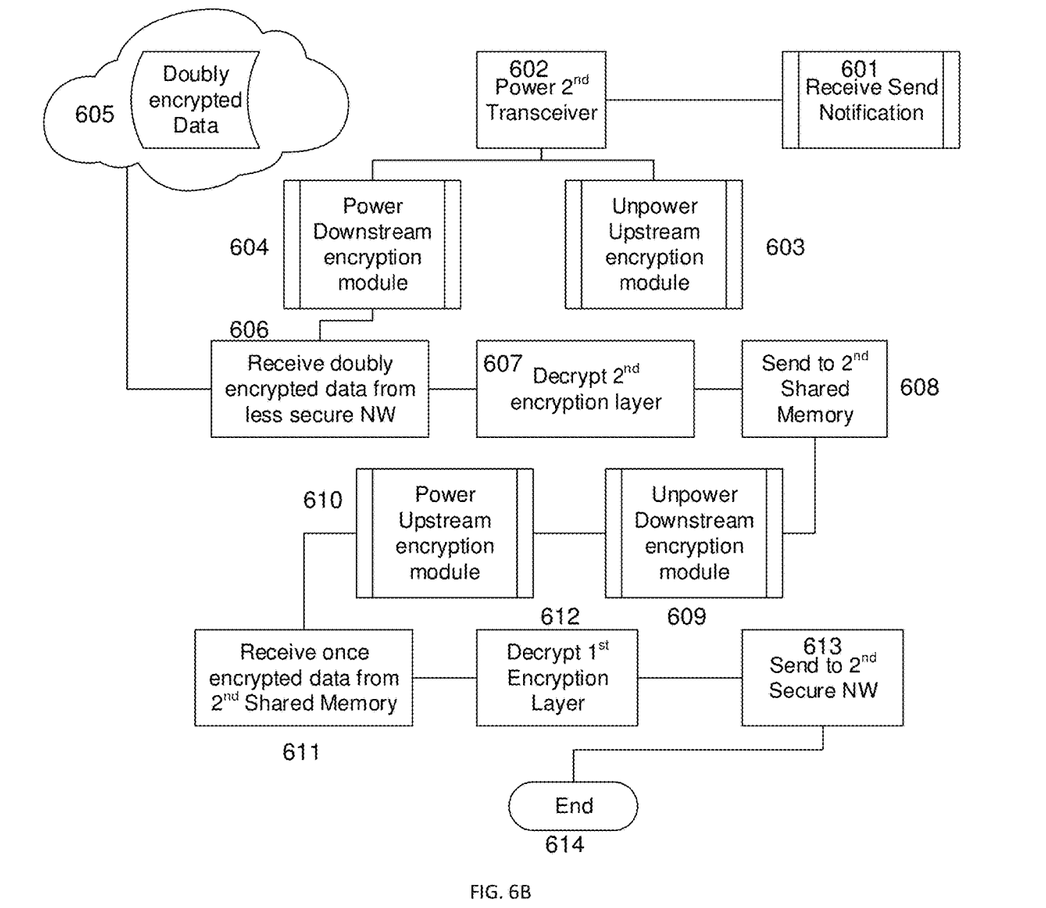

The mirror side is illustrated in FIGS. 2 and 3, where a receiving user, upon receiving indication 61 of the data being sent through the less secure network, powers 602 the receiving transceiver using the second programmable resource router (350, see e.g., FIG. 2), selectably powering 604 the DEM (330, see e.g., FIG. 2) of the second transceiver and unpowering 603 the UEM. Then, after receiving 606 the double (or multiple) encrypted data (402, see e.g., FIG. 2), using the second encryption key (334, see e.g., FIG. 2), decrypting 607 the doubly encrypted data (402, see e.g., FIG. 2) received 606 from the less secure network thereby generating a once encrypted data (401, see e.g., FIG. 2) and transfer 608 the (once encrypted) data to the second shared (receiving) non-volatile memory module (220, see e.g., FIG. 2) of the second transceiver.

Then, using the second programmable resource router (350, see e.g., FIG. 2), selectably powering off the DEM 609 of the second transceiver, thereby eliminating access from the DEM of the second transceiver to the second shared non-volatile memory (350, see e.g., FIG. 2) of the second transceiver. At that point, the receiving user, using the second programmable resource router, selectably powering 610 the UEM of the second transceiver. Once the UEM is powered and the DEM is powered off, transferring 611 the once encrypted data (401, see e.g., FIG. 3) from the second (receiving) shared non-volatile memory module (350, see e.g., FIG. 3) of the second transceiver to the UEM of the second transceiver, and then using the first encryption key (314, see e.g., FIG. 3), decrypting 612 the once encrypted transferred data (401, see e.g., FIG. 3); thereby completely decrypting the transferred data (400, see e.g., FIG. 3); and transferring 613 the completely decrypted data to the second secure network.

In an embodiment, the main CPU (111, see e.g., FIG. 1) of the UEM of the first transceiver (100, see e.g., FIG. 1) is in communication with the local memory 113 of the UEM 110 of the first transceiver 100, the local memory 113 of the UEM 110 of the first transceiver 100 having thereon a processor readable medium with a set of executable instructions configured to: receive data from the first secure network; using the first encryption key stored on the dedicated encryption key memory 114 of the UEM 110 of the first transceiver 100, encrypt the data; and transfer the encrypted data (401, see e.g., FIG. 1) to the first shared non-volatile memory 200. Likewise, the main CPU 131 of the DEM 130 of the first transceiver 100 is in communication with the local memory of the DEM 1113411133 of the first transceiver 100, the local memory of the DEM 134 of the first transceiver 100 having thereon a processor readable medium with a set of executable instructions (e.g., firmware) configured to: receive the (once) encrypted data 401 from the first shared non-volatile memory 200; using the second encryption key stored on the dedicated encryption key memory 134 of the DEM 130 of the first transceiver 100, encrypt the encrypted data; and transfer the doubly encrypted data 402 to the less secure network 250.

Furthermore, as illustrated in FIGS. 2 and 3, the main CPU 331 of the DEM 330 of the second transceiver 300 is in communication with the local memory 333 of the DEM 330 of the second transceiver 300, the local memory 333 of the DEM of the second transceiver having a processor readable medium thereon with a set of executable instructions configured to: receive (multiple encrypted) data 402 from the less secure network 250; using the second encryption key stored on the dedicated encryption key memory 334 of the DEM 330 of the second transceiver 300, decrypt the data; and transfer the (once) decrypted data 401 to the second shared non-volatile memory 220. Also, the main CPU 311 of the UEM 310 of the second transceiver 300 is in communication with the local memory 313 of the UEM 310 of the second transceiver 300, the local memory 313 of the DEM of the second transceiver having a processor readable medium thereon with a set of executable instructions configured to: receive (once decrypted) data 401 from the second shared non-volatile memory 220; using the first encryption key stored on the dedicated encryption key memory 314 of the UEM 310 of the second transceiver 300, decrypt the data; and transfer the decrypted data 400 to the second secured network 315.

It is to be understood, that the executable set of instructions of transceiver 100 can operate as transceiver 300 and transceiver 300 can operate as a sending transceiver 100. In other words, the transceiver devices are interchangeable. Further, it is to be understood that the upstream encryption module or the downstream encryption module of the second transceiver will operational only when selectably provided power by the first programmable resource router and that at no time will more than a single encryption module be in communication with the shared memory.

Furthermore, although only two encryption modules are described, the disclosure intends to encompass a plurality of transceivers, each being able to create an encryption layer that will be matched on the receiving end. Therefore, having three, four or more of the transceiver devices described herein, it will be possible to transfer the data to more than one recipient over a less secure network in a secure manner.

Memory device(s) as used in the systems, devices and methods described herein can be any of various types of non-transient memory devices or storage devices (in other words, memory devices that do not lose the information thereon in the absence of power). The term "memory device" is intended to encompass an installation medium, e.g., a CD-ROM, floppy disks, or tape device or a non-transient memory such as a magnetic media, e.g., a hard drive, optical storage, or ROM, EPROM, FLASH, etc. The memory device may comprise other types of memory as well, or combinations thereof. In addition, the memory medium may be located in a first computer in which the programs are executed, and/or may be located in a second different computer which connects to the first computer over a network, such as the Internet. In the latter instance, the second computer may further provide program instructions to the first computer for execution. The term "memory device" can also include two or more memory devices which may reside in different locations, e.g., in different computers that are connected over a network.

Additionally or alternatively, the memory may also be volatile memory. The term volatile memory may be used herein to refer to memory accessed by the processor in order to execute an operating system and/or one or more programs or executables on the device. Volatile memory may refer to and/or may be described as one or more of processor memory, program memory, dynamic memory, RAM, and/or the like. When volatile memory is used for example in the shared-memory modules (200, 220) (some or all of them), the system can be configured to maintain the data stored thereon even when the programmable resource router switches the power off from one encryption module (e.g. 110) to another (e.g., 130).

Further, the processor may be operably coupled to the various modules and components with appropriate circuitry. may also be used herein, the term(s) "operably coupled to", "coupled to", and/or "coupling" includes direct coupling between items and/or indirect coupling between items via an intervening item (e.g., an item includes, but is not limited to, a component, an element, a circuit, an engine, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

The term "module" is used herein to refer to software computer program code and/or any hardware or circuitry utilized to provide the functionality attributed to the module. Further, the term "module" or "component" can also refer to software objects or routines that execute on the computing system. The different components, modules, engines, and services described herein may be implemented as objects or processes that execute on the computing system (e.g., as separate threads). Likewise, "network switch" (see e.g., FIG. 4A, 180), refers to a network device which receives data at multiple input ports and provides that data to an output port (e.g., capable of returning a value in an ARP table), for transmission over a communication link, and may also include computer networking devices such as a hub, router, bridge, gateway, multilayer switch and the like. In an embodiment, the network switch is configured to support layer 3 switching/Routing.

Unless specifically stated otherwise, as apparent from the following discussions, it is appreciated that throughout the specification discussions utilizing terms such as "processing," "loading," "in communication," "transferring", "receiving", "sending", "detecting," "calculating," "determining", "analyzing," or the like, refer to the action and/or processes of a computer or computing system, or similar electronic computing device, that manipulate and/or transform data represented as physical, such as a transistor architecture into other data similarly represented as physical and structural layers.

As may also be used herein, the terms "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions (in other words, firmware). The processor, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, transient memory, non-transient memory, static memory, dynamic memory, flash memory, cache memory, and/or any device that stores digital information.

Note that if the processor, module, servers, network switches etc., processing circuit, and/or processing unit includes more than one processing device, the processing devices may be centrally located or may be distributed (e.g., cloud computing via indirect coupling via a local area network and/or a wide area network). Still further it is noted that, the memory element may store, and processor, module, processing circuit, and/or processing unit executes, hard coded and/or operational instructions corresponding to at least some of the steps and/or functions illustrated in one or more of FIGS. 1-4B elements. Such a memory device or memory element can be and is included in an embodiment as an article of manufacture.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

All ranges disclosed herein are inclusive of the endpoints, and the endpoints are independently combinable with each other. "Combination" is inclusive of blends, mixtures, alloys, reaction products, and the like. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the transceiver(s) includes one or more transceiver).

Reference throughout the specification to "one embodiment", "another embodiment", "an embodiment", and so forth, when present, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

Likewise, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

Although the foregoing disclosure has been described in terms of some embodiments, other embodiments will be apparent to those of ordinary skill in the art from the disclosure herein. Moreover, the described embodiments have been presented by way of example only, and are not intended to limit the scope of the inventions. Indeed, the novel methods, programs, devices and systems described herein may be embodied in a variety of other forms without departing from the spirit thereof. Accordingly, other combinations, omissions, substitutions and modifications will be apparent to the skilled artisan in view of the disclosure herein.

What is claimed:

1. A system for transferring data between secure location through less secure network, the system comprising:
    a first secure network;
    a first transceiver having at least an upstream encryption module configured to encrypt data using a first encryption key in communication with the first secure network, and a downstream encryption module configured to encrypt the encrypted data from the upstream encryption module using a second encryption key, the downstream encryption module being in communication with the less secure network, wherein the upstream encryption module of the first transceiver is configured to:
    provide and/or remove a first encryption layer on the data, and the downstream encryption module of the first transceiver is configured to: provide, and/or remove a second encryption layer on the data;
    a first shared non-volatile memory module, in communication with the upstream encryption module and the downstream encryption module of the first transceiver, wherein under no circumstances is the first shared non-volatile memory module is in communication with both the upstream encryption module and the downstream encryption module of the first transceiver simultaneously;
    a second secure network;
    a second transceiver having at least an upstream encryption module configured to decrypt data using a first encryption key in communication with the second secure network and a downstream encryption module configured to decrypt the data encrypted by the first transceiver and received from the less secure network using the second encryption key, the downstream encryption module being in communication with the less secure network, wherein the upstream encryption module of the second transceiver is configured to: provide and/or remove the first encryption layer on the data, and the downstream encryption module of the second transceiver is configured to: provide, and/or remove the second encryption layer on the data;
    a second shared non-volatile memory module, in communication with the upstream encryption module and the downstream encryption module of the second transceiver, wherein under no circumstances is the second shared non-volatile memory module in communication with both the upstream encryption module and the downstream encryption module of the second transceiver simultaneously, wherein the upstream encryption module and the downstream encryption module of each of the first and second transceivers, each comprises:
        i. a main central processing unit (CPU);
        ii. a power module;
        iii. a local non-transient memory; and
        iv. a dedicated encryption key memory.

2. The system of claim 1, wherein:
    the main CPU of the upstream encryption module of the first transceiver is in communication with the local non-transient memory of the upstream encryption module of the first transceiver, the local non-transient memory of the upstream encryption module of the first transceiver having thereon a processor readable medium with a set of executable instructions configured to:
        i. receive data from the first secure network;
        ii. using the first encryption key stored on the dedicated encryption key memory of the upstream encryption module of the first transceiver, encrypt the data providing a first encryption layer;
        iii. transfer the data with the first encryption layer to the first shared non-volatile memory module; and
    the main CPU of the downstream encryption module of the first transceiver is in communication with the local non-transient memory of the downstream encryption module of the first transceiver, the local non-transient memory of the downstream encryption module of the first transceiver having thereon a processor readable medium with a set of executable instructions configured to:

i. receive the data with the first encryption layer from the first shared non-volatile memory;
ii. using the second encryption key stored on the dedicated encryption key memory of the downstream encryption module of the first transceiver, encrypt the data with the first encryption layer, providing a second encryption layer; and
iii. transfer the data with the first and second encryption layers to the less secure network.

3. The system of claim 1, wherein:
the main CPU of the downstream encryption module of the second transceiver is in communication with the local non-transient memory of the downstream encryption module of the second transceiver, the local non-transient memory of the downstream encryption module of the second transceiver having a processor readable medium thereon with a set of executable instructions configured to:
i. receive the data with the first and second encryption layers of the first secured network from the less secure network;
ii. using the second encryption key stored on the dedicated encryption key memory of the downstream encryption module of the second transceiver, remove the second encryption layer from the data with the first and second encryption layers; and
iii. transfer the data with the first encryption layer to the second shared non-volatile memory module; and
the main CPU of the upstream encryption module of the second transceiver is in communication with the local non-transient memory of the upstream encryption module of the second transceiver, the local non-transient memory of the upstream encryption module of the second transceiver having a processor readable medium thereon with a set of executable instructions configured to:
i. receive the data with the first encryption layer from the second shared non-volatile memory;
ii. using the second encryption key stored on the dedicated encryption key memory of the upstream encryption module of the second transceiver, remove the first encryption layer from the data; and
iii. transfer the data to the second secure network.

4. The system of claim 1 wherein the upstream encryption module or the downstream encryption module of each of the first transceiver, and the second transceiver is operational only when selectably powered.

5. The system of claim 1, wherein the upstream encryption module of the first and/or second transceiver, each further comprises a primary CPU in communication with the respective first or second secure network and in one way communication with each of the main CPU, allowing for data transfer only in the direction from the respective secure network to the main CPU.

6. A method for transferring data between at least two secure networks through a less secure network implemented in a computerized system comprising: a first secure network; a first transceiver having at least an upstream encryption module configured to encrypt data using a first encryption key in communication with the first secure network and a downstream encryption module configured to encrypt the encrypted data from the upstream encryption module using a second encryption key, the downstream encryption module being in communication with the less secure network, wherein the upstream encryption module of the first transceiver is configured to: provide and/or remove a first encryption layer on the data, and the downstream encryption module of the first transceiver is configured to: provide, and/or remove a second encryption layer on the data; a first programmable resource router in communication with the upstream encryption module and the downstream encryption module of the first transceiver, wherein the first programmable resource router is manually activated; a first shared non-volatile memory module, in communication with the upstream encryption module and the downstream encryption module, wherein under no circumstances is the first shared non-volatile memory module in communication with both the upstream encryption module and the downstream encryption module of the first transceiver simultaneously; a second secure network; a second transceiver having at least an upstream encryption module configured to decrypt data using a first encryption key in communication with the second secure network and a downstream encryption module configured to decrypt the data received from the less secure network using the second encryption key, the downstream encryption module being in communication with the less secure network, wherein the upstream encryption module of the second transceiver is configured to: provide and/or remove the first encryption layer on the data, and the downstream encryption module of the second transceiver is configured to: provide, and/or remove the second encryption layer on the data; a second programmable resource router in communication with the upstream encryption module and the downstream encryption module of the second transceiver, wherein the second programmable resource router is manually activated; a second shared non-volatile memory module, in communication with the upstream encryption module and the downstream encryption module, wherein under no circumstances is the second shared non-volatile memory module in communication with both the upstream encryption module and the downstream encryption module of the second transceiver simultaneously, and wherein the upstream encryption module and the downstream encryption module of each of the first and second transceivers, each comprises: a main central processing unit (CPU); a power module; a local non-transient memory; and a dedicated encryption key memory, the method comprising:
a sending user, using the first programmable resource router, selectably powering the upstream encryption module of the first transceiver;
transferring the data from the first secure network to the upstream encryption module of the first transceiver;
using a first encryption key, providing the first encryption layer on the data;
transferring the data with the first encryption layer to the first shared non-volatile memory module of the first transceiver;
using the first programmable resource router, selectably powering off the upstream encryption module of the first transceiver, thereby eliminating access from the upstream encryption module of the first transceiver to the first shared non-volatile memory module of the first transceiver;
the sending user, using the first programmable resource router, selectably powering the downstream encryption module of the first transceiver;

transferring the data with the first encryption layer from the first shared non-volatile memory module of the first transceiver to the downstream encryption module of the first transceiver;

using a second encryption key, encrypting the data with the first encryption layer received from the first shared non-volatile memory module of the first transceiver, thereby providing the second encryption layer on the day with the first encryption layer received from the first secure network;

transferring the data with the first and second encryption layers to the less secure network;

a receiving user, upon receiving indication of the data with the first and second encryption layers being sent through the less secure network, using the second programmable resource router, selectably powering the downstream encryption module of the second transceiver;

using the second encryption key, removing the second encryption layer from the data with the first and second encryption layers received from the less secure network thereby generating data with the first encryption layer;

transferring the data with the first encryption layer to the second shared non-volatile memory module of the second transceiver;

using the second programmable resource router, selectably powering off the downstream encryption module of the second transceiver, thereby eliminating access from the downstream encryption module of the second transceiver to the second shared non-volatile memory of the second transceiver;

the receiving user, using the second programmable resource router, selectably powering the upstream encryption module of the second transceiver;

transferring the data with the first encryption layer from the second shared non-volatile memory module of the second transceiver to the upstream encryption module of the second transceiver;

using the first encryption key, decrypting data with the first encryption layer, thereby completely decrypting the data with the first encryption layer; and transferring the data to the second secure network.

7. The method of claim 6 wherein:

the main CPU of the upstream encryption module of the first transceiver is in communication with the local non-transient memory of the upstream encryption module of the first transceiver, the local non-transient memory of the upstream encryption module of the first transceiver having thereon a processor readable medium with a set of executable instructions configured to:
  i. receive data from the first secure network;
  ii. using the first encryption key stored on the dedicated encryption key memory of the upstream encryption module of the first transceiver, encrypt the data providing the first encryption layer; and
  iii. transfer the data with the first encryption layer to the first shared non-volatile memory; and the main CPU of the downstream encryption module of the first transceiver is in communication with the local non-transient memory of the downstream encryption module of the first transceiver, the local non-transient memory of the downstream encryption module of the first transceiver having thereon a processor readable medium with a set of executable instructions configured to:
  i. receive the data with the first encryption layer from the first shared non-volatile memory;
  ii. using the second encryption key stored on the dedicated encryption key memory of the downstream encryption module of the first transceiver, encrypt the data with the first encryption layer, providing the second encryption layer; and
  iii. transfer the data with the first and second encryption layers to the less secure network.

8. The method of claim 6 wherein the upstream encryption module or the downstream encryption module of each of the first and second transceivers is only operational when selectably powered by the first and second programmable resource router respectively.

9. The method of claim 6, wherein the upstream encryption module of the first and/or second transceiver, each further comprises a primary CPU in communication with the respective first or second secure network and in one way communication with the main CPU, allowing for data transfer only in the direction from the respective secure network to the main CPU.

10. The method of claim 6, prior to the step of, selectably powering the upstream encryption module of the first transceiver;
  using the primary CPU, receiving the data from the first secure network; and
  transferring the data to the main CPU using a data diode.

11. A network terminal device for secured data transfer comprising:
  a programmable network resource router;
  a shared memory module;
  an upstream encryption module in communication with a secure network, the programmable network resource router, and the shared memory module; and
  a downstream encryption module in communication with a less secure network, the programmable network resource router and the shared memory module, wherein the programmable network resource router is programmed to only enable communication between the upstream encryption and the shared memory module, or the downstream encryption module and the shared memory module but not both simultaneously, and wherein data transferred between the secured network and the less secured network is double encrypted,
  wherein the upstream encryption module and the downstream encryption module, each comprises:
    a main central processing unit (CPU);
    a power module;
    a local non-transient memory; and
    a dedicated encryption key memory; and
  wherein: the main CPU of the upstream encryption module is in communication with the local non-transient memory of the upstream encryption module having thereon a processor readable medium with a set of executable instructions configured to cause the processor to:
    i. receive data from the secure network;
    ii. using the first encryption key stored on the dedicated encryption key memory of the upstream encryption module, encrypt the data providing a first encryption layer; and
    iii. transfer the data with the first encryption laver to the shred memory module; and
  the main CPU of the downstream encryption module is in communication with the local non-transient memory of the downstream encryption module, the local non-transient memory having thereon a processor readable medium with a set of executable instructions configured to cause the processor to:
- iv. receive the data with the first encryption layer from the shared non-volatile memory;
- v. using the second encryption key stored on the dedicated encryption key memory of the downstream encryption module, encrypt the data with the first encryption layer, providing a second encryption layer; and
- vi. transfer the data with the first and second encryption layers to the less secure network.

12. The device of claim 11, wherein the upstream encryption module and the downstream encryption module is operational only when selectably powered by the programmable resource router.

* * * * *